US008242891B2

(12) United States Patent
Sugahara

(10) Patent No.: US 8,242,891 B2
(45) Date of Patent: Aug. 14, 2012

(54) ESTIMATING METHOD, ESTIMATING SYSTEM AND PROGRAM

(75) Inventor: Hiroto Sugahara, Tokyo (JP)

(73) Assignee: NEC Corporation, Tokyo (JP)

( * ) Notice: Subject to any disclaimer, the term of this patent is extended or adjusted under 35 U.S.C. 154(b) by 1084 days.

(21) Appl. No.: 12/095,589

(22) PCT Filed: Nov. 22, 2006

(86) PCT No.: PCT/JP2006/323322
§ 371 (c)(1),
(2), (4) Date: May 30, 2008

(87) PCT Pub. No.: WO2007/063758
PCT Pub. Date: Jun. 7, 2007

(65) Prior Publication Data
US 2010/0219940 A1 Sep. 2, 2010

(30) Foreign Application Priority Data

Dec. 2, 2005 (JP) ................................. 2005-348613

(51) Int. Cl.
*H04Q 5/22* (2006.01)
*G08B 13/14* (2006.01)
*H04L 12/413* (2006.01)
*H04L 12/43* (2006.01)
*H04J 3/02* (2006.01)
*H04B 1/16* (2006.01)
*H04B 7/00* (2006.01)
*H04W 40/00* (2009.01)

(52) U.S. Cl. ................... 340/10.4; 340/10.2; 340/572.4; 370/447; 370/448; 370/461; 370/462; 455/343.1; 455/446; 455/522

(58) Field of Classification Search .............. 340/10.2, 340/10.4, 572.4; 370/447–448, 461–462; 455/522, 343.1, 446
See application file for complete search history.

(56) References Cited

U.S. PATENT DOCUMENTS
6,104,291 A * 8/2000 Beauvillier et al. ....... 340/572.1
(Continued)

FOREIGN PATENT DOCUMENTS
JP 2001-168904 A 6/2001
(Continued)

OTHER PUBLICATIONS

Hiroshi Sugahara, et al.; "Radioscape-RFID, a Visual Simulator for Communication Qualities of Active-RFID Systems"; Proceedings of the 2005 IEICE General Conference, B-5-113; Internet Systems Research Laboratories, NEC Corporation.

(Continued)

*Primary Examiner* — Daniel Wu
*Assistant Examiner* — Kam Ma
(74) *Attorney, Agent, or Firm* — Sughrue Mion, PLLC

(57) ABSTRACT

To estimate a tag read status of a passive RFID system in an actual operation environment. A method for estimating, by simulation, a tag read status of an RFID system comprises the steps of calculating the power supply activation status of each of one or more tags having IDs within a range in which the tag moves; and analyzing the operation of a collision avoidance protocol provided in the RFID system. The tag has a state parameter representative of the state of the tag. For a command signal in conformance with the collision avoidance protocol, the operation and state parameter of the tag are changed in accordance with the power supply activation status when the command signal is being processed in the tag.

14 Claims, 6 Drawing Sheets

U.S. PATENT DOCUMENTS

| | | | |
|---|---|---|---|
| 6,346,881 B1 * | 2/2002 | Davidson | 340/514 |
| 6,445,297 B1 * | 9/2002 | Nicholson | 340/572.7 |
| 7,161,489 B2 * | 1/2007 | Sullivan et al. | 340/572.4 |
| 7,253,717 B2 * | 8/2007 | Armstrong et al. | 340/10.2 |
| 7,359,823 B2 * | 4/2008 | Forster | 702/122 |
| 2003/0067414 A1 * | 4/2003 | Cole et al. | 343/742 |
| 2005/0035849 A1 * | 2/2005 | Yizhack | 340/5.92 |
| 2005/0154572 A1 * | 7/2005 | Sweeney | 703/13 |
| 2005/0280507 A1 * | 12/2005 | Diorio et al. | 340/10.1 |
| 2007/0136036 A1 * | 6/2007 | Sweeney et al. | 703/6 |
| 2008/0150674 A1 * | 6/2008 | Park et al. | 340/3.41 |

FOREIGN PATENT DOCUMENTS

| | | | |
|---|---|---|---|
| JP | 2004247971 A | * | 9/2004 |
| JP | 2004-280328 A | | 10/2004 |

OTHER PUBLICATIONS

Jin Mitsugi, et al.; "Performance Degradation of 950MHz RFID Due to Fading"; Proceedings of the 2005 IEICE General Conference, B-1-38; Auto-ID Laboratory Japan, Keio University.

* cited by examiner

ESTIMATING METHOD, ESTIMATING SYSTEM AND PROGRAM

APPLICABLE FIELD IN THE INDUSTRY

The present invention relates to a method of, in a passive type RFID system, estimating a read situation of a tag in an actual operation environment and its system.

BACKGROUND ART

As an RFID system, there exist an active type system in which a tag itself accommodates a power supply integrally, and makes origination of an identification signal (ID), and a passive type system in which after a tag receives the power supply from a reading device (reader), it gives an ID as a reply. In particular, it is expected that the system employing a UHF band as a radio frequency, out of the passive type RFID systems, is put to practical use as a system for inspecting a plurality of commodities in a lump in a distribution spot, or the like because it has a longer read range performance as compared with the system employing another frequency band. Specifically, the tag, being a transmitting device having a function of transmitting an inherent ID, is affixed to each commodity, and a forklift carrying a plurality of commodities passes through a reading gate (reader gate) equipped with a read antenna, thereby allowing an inspection as to which commodity is received/delivered to be automatically made.

Needless to say, such a practical use form demands a level close to 100% as a probability (a read rate) that the ID being transmitted from the tag is correctly read off; however as a matter of fact, the read rate declines due to various factors. As one factor for causing this read rate to decline, the fact that a collision avoidance protocol does not operate efficiently under an environment in which a reception power of the tag fluctuates due to a fading can be listed. This phenomenon will be explained in details.

When the reader requests an ID reply of a plurality of tags, each of these tags transmits the ID as a reply at an identical timing after receiving a command from the reader. For this, reply signals of the tags collide with each other, and resultantly the ID cannot be read off in the reader side. So as to avoid a collision of the tag companions, the passive type RFID system is provided with a collision avoidance protocol. In the collision avoidance protocol, the tags, each of which becomes an object of the reading-off, are grouped responding to the IDs, and each group is caused to individually giving the ID as a reply in some cases, or the tag, which has been recognized once by the reader, is caused to stop to give the ID as a reply for a constant time period in some cases, thereby avoiding a collision of the tag companions On the other hand, in an actual operation environment, the fading occurs because a plurality of propagation paths exist between an antenna of a reader and a tag, and resultantly they overlap each other. For this, the reception power from the reader largely fluctuates while the tag passes through the reader gate, so the case that the power supply is switched on owing to supplying a sufficient power to the tag, and the case that the power supply is switched off due to supplying an insufficient power to the tag alternate. In a case where the power supply is switched off when the tag is receiving a command from the reader, or when the tag itself is transmitting the ID as a reply, it follows that the ID transmission from the tag to the reader is not made correctly.

Further, the passive RFID tag is provided with a parameter representative of a "status". As the so-called "status" of the tag, there exist, for example, a status (standby status) in which the tag stands by for a purpose of making the ID reply, a status (reply stop status) in which the ID has been already read off by the reader and the ID reply has been stopped, or the like. In the case that after the power supply of the tag is switched off temporarily, it is switched on again, these statuses cannot be stored as a status prior to the switching-off of the power supply. For this reason, when after the power supply of the tag, which is in a reply stop status, is switched off temporarily, it is switched on again, the above tag makes the ID reply again because it has not stored that it was previously in a reply stop status, which causes a collision to occur. Such a phenomenon causes the collision avoidance protocol not to operate efficiently in the actual operation environment, and hence the read rate to decline.

Alleviating such a problem of a decline in the read rate necessitates a design scheme such as optimizing an installation location of the antenna, and an operation schemes such as putting limits to the number of the tag and slowing the migration speed. Obtaining such a design guideline and an operation guideline, however, necessitates the method of precisely estimating the read situation (read rate etc.) of the tag in the actual operation environment, and its system.

As a related art of the simulator of estimating a performance in the RFID, there exists the technique disclosed in Non-Patent document 1. This technique is a technique of estimating a radio wave propagation situation ranging from the active type RFID tag to the receiver with a radio wave propagation estimating method, and visualizing the readable range. Applying this technique for the passive RFID makes it possible to visualize the range in which the ID can be read off by the reader antenna; however, as a matter of fact, how many pieces of the tags can be read off correctly cannot be estimated because plural pieces of the tags pass through its readable range.

Further, as a technique of analyzing the upper limit of the migration speed of the tag from a result of having actually measured the fading and an operation of the collision avoidance protocol, there exists the technique disclosed in Non-Patent document 2. The Non-Patent document 2, in which 1.3 sec. is calculated as a time necessary for reading off the 60 pieces of the tags in a lump in the collision avoidance protocol, mentions that it is difficult to secure an endurance time (a time that the reception power equal to or more than a reception sensitivity has been secured for the tag) of 1.3 sec. judging from the situation of the fading actually measured. Employing the technique disclosed in this document makes it possible to calculate back to the migration speed for securing the endurance time of 1.3 sec., which can be adopted as an operation guideline. However, this technique is grounded upon the assumption that all tags are fogged with an identical fading pattern, respectively. That is, it is grounded upon the assumption that all tags are in a status of having been switched on during the endurance time of 1.3 sec.

However, it is unthinkable that all tags are fogged with an identical fading pattern, respectively, in the actual operation environment because the situation in which the fading occurs changes when a space between the tag companions becomes equal to or larger than a half of a wavelength (with a UHF band RFID, approx. 16 cm. That is, even though it is supposed that the endurance time of 1.3 sec. has been secured for one certain piece of the tag, all tags cannot be read off always for 1.3 sec. because any of the other 59 pieces of the tags might be in a status in which the power supply thereof has been switched off. Contrarily, when the endurance time of a certain extent has been intermittently secured for all tags even though the endurance time of 1.3 sec. has not been secured, the case as well that all tags can be read off could occur. With the technique described in this non-patent document 2, it is impossible to cope with such a situation that occurs in the actual operation environment.

On the other hand, upon paying an attention to the method of estimating a performance in the communication system other than the RFID system, as a technique of estimating a throughput feature with a co-simulation of a physical layer and an MAC layer, there exists the technique disclosed in JP-P2001-168904A (Patent document 1). This technique is a technique of preparing snapshots of working spaces of a plurality of users, selecting one part of packets generated in the above working spaces as a loss packet based upon a result of estimating the radio wave situation with a physical layer simulation, processing the remaining packets not selected as a loss packet with an MAC layer simulation, and estimating a throughput feature.

Now think whether this technique described in this Patent document 1 can be applied for estimating the read rate of the passive RFID by replacing the user with the tag, the packet with the sending-out of the ID from the tag, the physical layer simulation with the estimation of the radio wave situation, the MAC layer simulation with the collision avoidance protocol, and the throughput with the read rate, respectively.

With the technique described in this patent document 1, it follows that the positions of plural pieces of the tags are secured as one snapshot, the tags that cannot give the ID as a reply are pre-excluded based upon an estimation result of the radio wave situation, the collision avoidance protocol is applied only for the tags that have not been excluded. That is, the physical layer simulation (exclusion of the tags based upon the radio wave situation estimation) and the MAC layer simulation (collision avoidance protocol) are executed separately. At the moment of estimating the read situation of the passive RFID, however, the power supply on/off situation of the tag in the middle of a command of the foregoing collision avoidance protocol being processed in the tag largely exerts an influence upon an operation efficiency of the collision avoidance protocol.

Thus, the collision avoidance protocol and the radio wave situation need to be synchronized with each other for analysis. That is, the operation of the tag for the command of the collision avoidance protocol has to be appropriately changed according to the power supply on/off situation of the tag in the middle of the above command being processed in the tag. For this reason, this technique of separately executing the physical layer simulation and the MAC layer simulation for one snapshot is not applicable.

Further, at the moment of estimating the read situation of the passive RFID, a change in the status of the tag due to the foregoing power supply on/off situation of the tag largely exerts an influence upon an operation efficiency of the collision avoidance protocol. Thus, it is necessary that each tag holds a parameter representative of the "status" and the status of this tag is synchronized with the collision avoidance protocol and the radio wave situation for analysis. That is, the status of the tag has to be appropriately changed according to the power supply on/off situation of the tag in the middle of the command of collision avoidance protocol being processed in the tag. For this reason, this technique described in the Patent document 1, which includes no parameter equivalent to the status of the tag, is not applicable.

[Non-Patent document 1] Hiroshi Sugawara, Takeshi Ono et al.; "RADIOSCAPE-RFID", a visual simulator for communication qualities of active-RFID systems;" Proceedings of the 2005 IEICE General Conference, B-5-113

[Non-Patent document 2] Jin MITSUGU and Hisakazu HADA; "Performance degradation of 950 MHz RFID due to a fading;" Proceedings of the 2005 IEICE General Conference, B-1-38

[Patent document 1] JP-P2001-168904A

Problems to be Solved by the Invention

As mentioned so far, even though any background art was employed, it was impossible to provide the method of precisely estimating the read situation (read rate etc.) of the tag in the actual operation environment, and its system. For example, applying the technique disclosed in the Non-Patent document 1 for the passive type RFID makes it possible to visualize the range in which the ID can be read off by the reader antenna; however, as a matter of fact, how many pieces of the tags can be read off correctly cannot be estimated because plural pieces of the tags pass through its readable range.

Further, with the technique disclosed in the Non-Patent document 2, the read situation cannot be estimated unless the fading patterns with which plural pieces of the tags each of which becomes an object of the reading-off are fogged are all identical. Besides, in a case of having applied the technique disclosed in the Patent document 1 for the passive type RFID, it is impossible to analyze the situation such that the operation of the tag for the command of the collision avoidance protocol is appropriately changed according to the power supply on/off situation of the tag in the middle of the above command being processed in the tag because the physical layer simulation and the MAC layer simulation are separately executed for one snapshot.

Further, the situation such that the status of the tag is appropriately changed according to the power supply on/off situation of the tag in the middle of the command of the collision avoidance protocol being processed in the tag cannot be analyzed because no parameter equivalent to the status of the tag exists.

Means for Solving the Problems

The 1st invention for solving the above-mentioned problems, which is an estimating system, characterized in comprising: a power supply status estimating means for, within a detection region in which a detection object to which a transmitting device has been affixed should be detected, estimating a power supply activation status of said transmitting device accompanied by a migration of said detection object; a status estimating means for estimating a status of said transmitting device accompanied by the migration based upon said estimated power supply activation status of the transmitting device and a history of an operation of said transmitting device; and an operation estimating means for, responding to a command, determining an operation of said transmitting device based upon the status of this transmitting device.

The 2nd invention for solving the above-mentioned problems is characterized in that, in the 1st invention, said operation estimating means, when the number of the transmitting device having replied to a reply request command is one, determines that this transmitting device is identifiable.

The 3rd invention for solving the above-mentioned problems is characterized in that, in the 1st or 2nd inventions, said operation estimating means, when the number of the transmitting device having replied to a reply request command is two or more, determines that the transmitting device is unidentifiable.

The 4th invention for solving the above-mentioned problems is characterized in that, in the 3rd invention, when said operation estimating means has determined that the transmitting device is unidentifiable, it decides a kind of the command based upon a collision avoidance protocol simulating means, being an agreement for preventing the reply from colliding.

The 5th invention for solving the above-mentioned problems is characterized in that, in one of the 1st to 4th inventions, said operation estimating means comprises a means for estimating an average reply situation of the transmitting device based upon a result of having executed the operation a predetermined number of times.

The 6th invention for solving the above-mentioned problems is characterized in, in the 5th invention, causing said average response situation of the transmitting device to fall under a predetermined range.

The 7th invention for solving the above-mentioned problems is characterized in that, in one of the 1st to 6th inventions, said operation is a reply by said transmitting device to the command.

The 8th invention for solving the above-mentioned problems, which is an estimating system, characterized in comprising: a power supply status estimating means for, within a detection region in which a detection object to which a transmitting device has been affixed should be detected, estimating a power supply activation status of said transmitting device accompanied by a migration of said detection object; and a collision status estimating means for estimating a collision status of said reply by the transmitting device to the command based upon said power supply activation status of the transmitting device.

The 9th invention for solving the above-mentioned problems, which is an estimating method, characterized in comprising: a power supply status estimating step of, within a detection region in which a detection object to which a transmitting device has been affixed should be detected, pre-estimating a power supply activation status of said transmitting device accompanied by a migration of said detection object; a status estimating step of estimating a status of said transmitting device accompanied by the migration based upon said estimated power supply activation status of the transmitting device and a history of an operation of said transmitting device; and an operation estimating step of, responding to a command, determining an operation of said transmitting device based upon the status of this transmitting device.

The 10th invention for solving the above-mentioned problems is characterized in that, in the 9th invention, said operation estimating step, when the number of the transmitting device having replied to a reply request command is one, determines that this transmitting device is identifiable.

The 11th invention for solving the above-mentioned problems is characterized in that, in the 9th or 10th inventions, said operation estimating step, when the number of the transmitting device having replied to a reply request command is two or more, determines that the transmitting device is unidentifiable.

The 12th invention for solving the above-mentioned problems is characterized in that, in the 11th invention, when said operation estimating step has determined that the transmitting device is unidentifiable, it decides a kind of the command based upon a collision avoidance protocol simulating means, being an agreement for preventing the reply from colliding.

The 13th invention for solving the above-mentioned problems is characterized in that, in one of the 9th to 12th inventions, said operation estimating step comprises step of estimating an average reply situation of the transmitting device based upon a result of having executed the operation a predetermined number of times.

The 14th invention for solving the above-mentioned problems is characterized in that, in 13th invention, causing said average response situation of the transmitting device to fall under a predetermined range.

The 15th invention for solving the above-mentioned problems is characterized in that, in one of the 9th to 14th inventions, said operation is a reply by said transmitting device to the command.

The 16th invention for solving the above-mentioned problems, which is an estimating method, characterized in comprising: a power supply status estimating step of, within a detection region in which a detection object to which a transmitting device has been affixed should be detected, estimating a power supply activation status of said transmitting device accompanied by a migration of said detection object; and a collision status estimating step of estimating a collision status of said reply by the transmitting device to the command based upon said power supply activation status of the transmitting device.

The 17th invention for solving the above-mentioned problems, which is a program for causing a computer to execute: a power supply status estimating process of, within a detection region in which a detection object to which a transmitting device has been affixed should be detected, pre-estimating a power supply activation status of said transmitting device accompanied by a migration of said detection object; a status estimating process of estimating a status of said transmitting device accompanied by the migration based upon said estimated power supply activation status of the transmitting device and a history of an operation of said transmitting device; and an operation estimating process of, responding to a command, determining an operation of said transmitting device based upon the status of this transmitting device.

The 18th invention for solving the above-mentioned problems is characterized in that, in the 19th invention, said operation is a reply by said transmitting device to the command.

The 19th invention for solving the above-mentioned problems, which is a program for causing a computer to execute: a power supply status estimating process of, within a detection region in which a detection object to which a transmitting device has been affixed should be detected, estimating a power supply activation status of said transmitting device accompanied by a migration of said detection object; and a collision status estimating process of estimating a collision status of said reply by the transmitting device to the command based upon said power supply activation status of the transmitting device.

An Advantageous Effect of the Invention

The present invention makes it possible to clarify the design guidelines for realizing a desired performance such as optimization of the installation location of the antenna and the optimization of the protocol parameter, and the operation guidelines such as the upper limit of the number of the transmitting devices (tags) and the migration speed thereof in the actual operation environment. Further, a desired specification by the system side for the degree of dispersion in the reception sensitivity of the transmitting device (tag) can be clarified. In addition hereto, for the various technologies of improving the system performance for the passive RFID, by clarifying its quantitative effect, the optimal form of each technology can be derived.

The reason is that by appropriately changing the operation (reply status) of the transmitting device (tag) for a reply command taking the collision avoidance protocol into consideration, and the "status" given to each transmitting device (tag), the read situation of the transmitting device (tag) in the actual operation environment is estimated. More specifically, at least each of the number of the pieces of the tags each of which is a transmitting device having a function of transmitting the inherent ID, its migration range, and its migration speed is given as an actual operation environment, the degree of a fluctuation in the tag reception power within the migration range is individually given to each tag by employing the simulation or the actual measurement, the minimum value (reception sensitivity) of the reception power necessary for allowing the tag to be activated is given, the power supply activation situation (the situation of a fluctuation in the power supply on/off) in the migration range is given to each tag based upon the reception power and the reception sensitivity, and by appropriately changing, for a command of the collision avoidance protocol, the operation of the tag for the above command and the "status" given to each tag according to the power supply on/off situation of the tag in the middle of the above command being processed in the tag at the moment of estimating the reading operation, the method of estimating the read situation of the tag in the actual operation environment and its system are provided.

Figure 1:
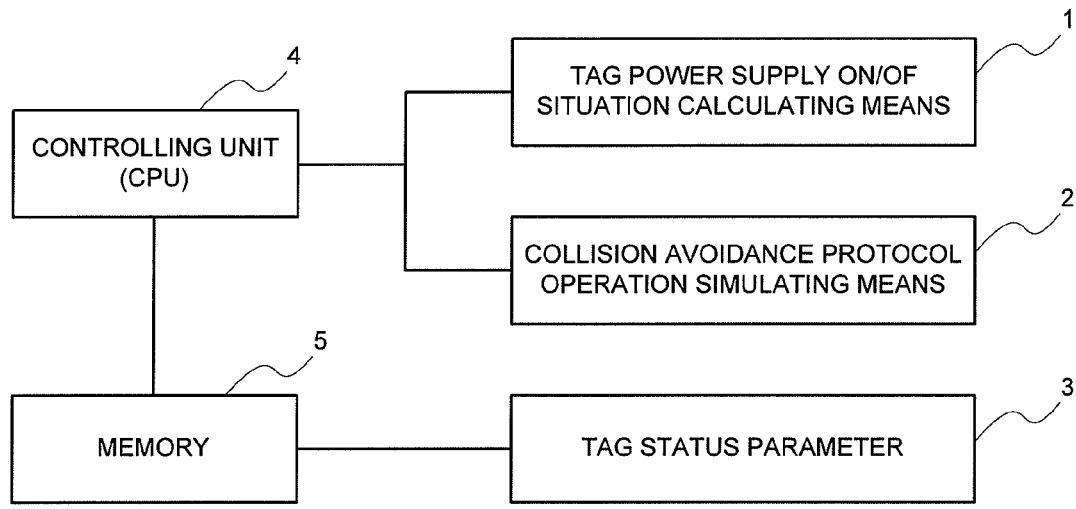
FIG. 1 is a functional block diagram of a summary of an exemplary embodiment of the present invention.

DESCRIPTION OF NUMERALS 1 tag power supply on/off situation calculating means
2 collision avoidance protocol operation simulating means
3 tag status parameter
4 controlling unit (CPU)
5 memory

BEST MODE FOR CARRYING OUT THE INVENTION

The present invention relates to the estimating device for estimating (simulating) the operation of each tag according to a command by the reading device at the moment that one detection object or a plurality of ones to which the tag, being a transmitting device for transmitting each inherent identifier, has been affixed migrates in the adjacent of the reading device. Herein, as one of the operations of the tag, there exists the operation of replying to a command from the reading device. So as to make this estimation, at first, a power supply status estimating means (equivalent to a tag power supply on/off situation calculating means 1 and a controlling unit 4 of FIG. 1) estimates a power supply activation status of the transmitting device (tag) accompanied by the migration of the detection object within a detection-object region.

Next, a status estimating means (equivalent to a collision avoidance protocol operation simulating means 2 and the controlling unit 4 of FIG. 1) estimates a status (a standby status, a reply stop status, or the like) of the transmitting device accompanied by the migration based upon the estimated status (power supply activation status or the like) of the tag and a operation history such as the reply of the transmitting device. Further, an operation estimating means (equivalent to the collision avoidance protocol operation simulating means 2 and the controlling unit 4 of FIG. 1) determines the operation such as a reply to the read command based upon the estimated status of the transmitting device.

Herein, as one example of the operation of the transmitting device, the case that the command from the reading device is a command for requesting a reply of the transmitting device is outlined. In this case, it is determined whether or not the transmitting device makes a reply based upon the status of the transmitting device estimated from the power supply activation status of the transmitting device estimated by the power supply status estimating means and a reply history (whether or not a reply has been already made for the reading device) of the transmitting device. The details will be described in the following exemplary examples 1 to 4.

AN Exemplary Example 1

The exemplary example 1 will be explained while a reference to the accompanied drawings is made. FIG. 1 is a functional block diagram illustrating a summary of the exemplary embodiment of the present invention. The system of this exemplary embodiment is a system for estimating the read situation of the tag, being a transmitting device having a function of transmitting the inherent ID in the actual operation environment. This system, as shown in FIG. 1, includes and is configured of the tag power supply on/off situation calculating means 1, the collision avoidance protocol operation simulating means 2, a tag status parameter 3, and the controlling unit 4 and a memory 5.

The tag power supply on/off situation calculating means 1 has a function of, by employing a result obtained by simulating or actually measuring the degree of a fluctuation in the reception power during the migration of the tag from a migration starting point (stating point) to a migration finishing point (finishing point) and the minimum value (reception sensitivity) of the reception power necessary for allowing the power supply of the tag to be switched on, calculating the tag power supply activation situations (the situation of the location in which the power supply of the tag is switched on and the location in which the power supply of the tag is switched off, and the tag power supply on/off situation) within the tag migration range. The collision avoidance protocol operation simulating means 2 has a function of simulating the operation of the collision avoidance protocol that the RFID system, being an object of evaluation, introduces. The tag status parameter 3 is a parameter representative of the status of each tag. The controlling unit 4 is a CPU for controlling the tag power supply on/off situation calculating means 1 and the collision avoidance protocol operation simulating means 2, and the memory 5 functions as a working memory of this CPU, also can file the tag status parameter 3 in addition hereto, and further, can file a program of the present invention.

Figure 2:
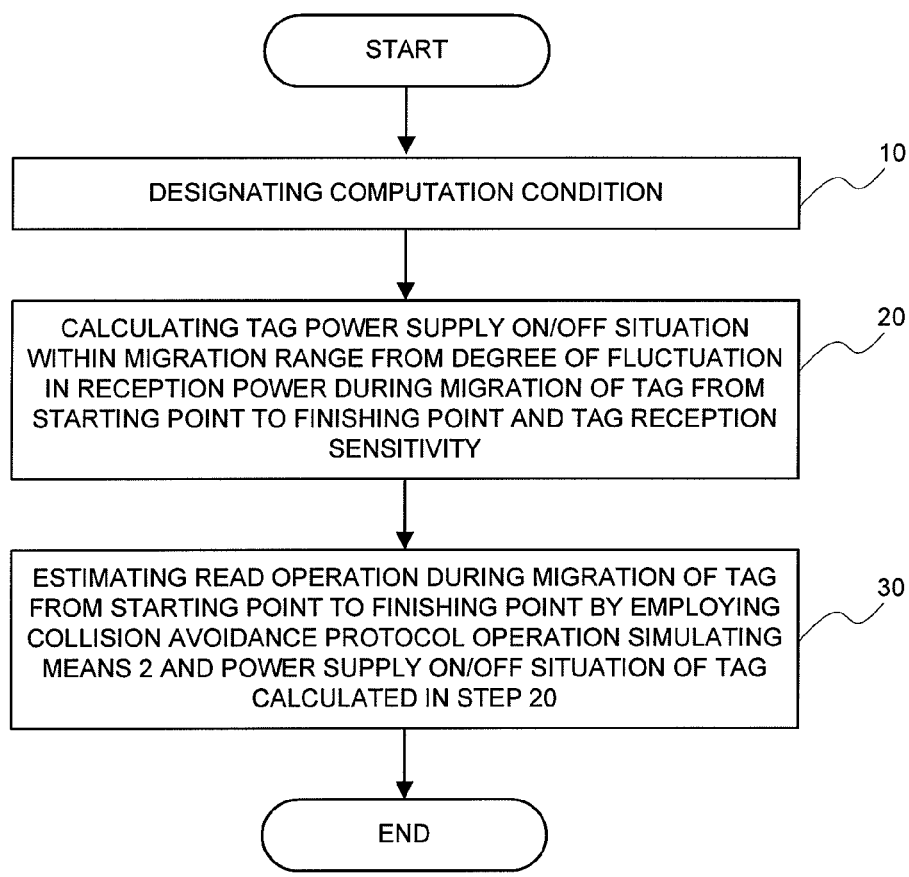
FIG. 2 is a flowchart illustrating a summary of an operation of a first exemplary example or a second exemplary example of the present invention.

FIG. 2 is a flowchart illustrating a summary of an operation of FIG. 1 in this exemplary example. In this system, at first, a user designates a computation condition (step 10). The computation condition to be mentioned here includes, for example, a transmission power of the reader antenna of the RFID system, being an object of evaluation, an antenna pattern, an installation position and an installation form, a reception feature of the reader, being a reading device, the number of pieces of the tags, an affixation location, an affixation-object article, a reception feature of the tag, the migration speed, the migration range, and surrounding layout information, etc.

Herein, the reception feature of the reader includes a feature of a rate of a bit error over the reception power in the reader, or the like. Further, the reception feature of the tag includes a feature of a rate of a bit error over the reception power in the tag, the reception power (reception sensitivity) necessary for allowing the power supply of the tag to be switched on, the time (the power supply refreshing time) that is required until the power supply of the tag is switched off due to the fact that no power supply is given to the tag, or the like. In many cases, the user designates these conditions via an input interface of the read situation estimating system of the present invention. However, all conditions described above may not be input in the step 10 because all conditions described above are not always required depending upon the exemplary embodiment.

Next, by employing the tag power supply on/off situation calculating means 1, the tag power supply on/off situation within the tag migration range is calculated by employing a result obtained by performing a deterministic simulation, a statistical approach, or an actual measurement for the degree of a fluctuation in the reception power during the migration of the tag from a stating point to a finishing point, the tag reception sensitivity designated in the step 10, and the tag power supply refreshing time (step 20). The status estimating means, which is not shown in the figure, performs the operation of this step 20. In a case of obtaining the degree of a fluctuation in the reception power with the deterministic simulation, out of the computation conditions designated in the step 10, the transmission signal output of the reader antenna, the antenna pattern, the installation position and direction, the affixation location of the tag, the affixation-object article, the migration range, the surrounding layout information, etc. are employed.

In addition hereto, estimating the situation of the propagation of the radio wave from the reader antenna to each point of the tag migration range with the deterministic radio wave propagation estimating method, and synthesizing the propagation paths that reach each point of the tag migration range from the reader antenna by taking a phase into consideration make it possible to calculate the reception power at each point. As a deterministic radio wave propagation estimating method being employed herein, for example, a ray-tracing method is employed.

In a case of obtaining the degree of a fluctuation in the reception power with the statistical approach, out of the computation conditions designated in the step 10, the transmission signal output of the reader antenna, the antenna pattern, the installation position and direction, the affixation location of the tag, the affixation-object article, the migration range, the surrounding layout information, etc. are employed.

Figure 7:
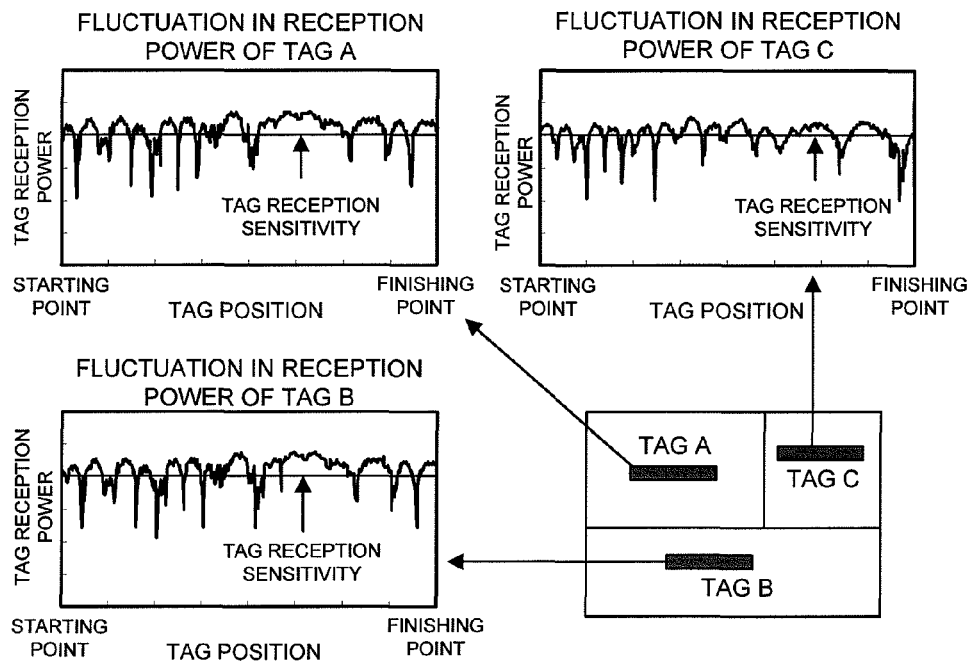
FIG. 7 is a view for explaining a step 20 of the present invention.

In addition hereto, a situation of the prospect from the reader antenna up to the tag migration range, or the like is determined, and each parameter of a Rayleigh distribution or a Rice distribution is decided. When the tags each of which is an object of the reading-off exist plurally, as shown in FIG. 7, the power supply on/off situation is individually calculated for each tag. Next, the read operation during the migration of the tag from the starting point to the finishing point is estimated, by employing the collision avoidance protocol operation simulating means 2, and the power supply on/off situation of the tag calculated in the step 20 (step 30). An operation estimating means, which is not shown in the figure, performs the operation of this step 30.

In the step 30, with a command of the collision avoidance protocol, the operation of the tag for the above command and the [status] given to each tag are appropriately changed according to the power supply on/off situation of the tag in the middle of the above command being processed in the tag.

Figure 5:
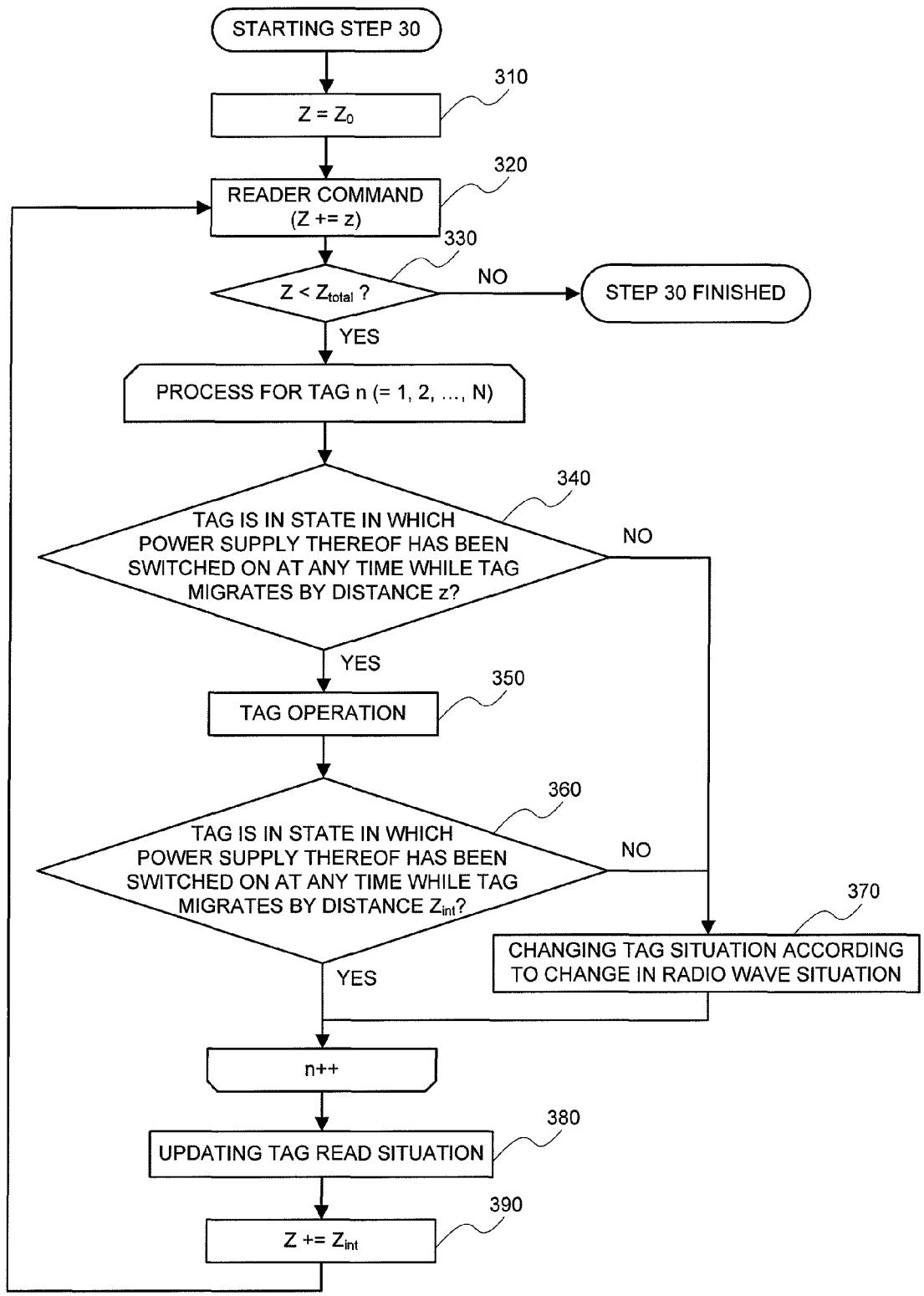
FIG. 5 is a flowchart illustrating the details of an operation of a step 30 of the present invention.

The detailed flowchart of the step 30 is shown in FIG. 5. Herein, Z is a parameter representative of a position of the tag at its time point. At first, the tag position Z is incremented to a location ($Z\_0$) in which the command, which is issued firstly after the tag starts to migrate, is received (step 310). The migration distance of the tag such as $Z\_0$ can be calculated from a timing at which the reader transmits the command and the migration speed designated in the step 10.

Next, the command being transmitted from the reader is decided in accordance with a specification of the collision avoidance protocol operation simulating means 2 for simulating the operation of the collision avoidance protocol, being an agreement for preventing the reply from colliding. As one example of the collision avoidance protocol, it is thinkable that when a plurality of the tags have given the IDs as a reply to a reply request by the reading device (reader), these tags are divided into a plurality of groups, and the reading device (reader) makes a reply request again only for one group out of these groups.

Further, a distance z by which the tag migrates until a process of the above command is finished in the tag side is added to Z (step 320). Herein, the so-called process of the above command includes a process of receiving a signal of the above command, and if the above command urges the tag to perform some action, a process of its operation.

Next, it is determined whether or not the position Z of the tag has exceeded $Z\_total$, being a distance from the stating point up to the finishing point of the tag (step 330), and when a determination in the step 330 is No (Z is equal to or more than $Z\_total$), it means that the tag has already reached the finishing point, so the process of the step 30 is finished.

When a determination in the step 330 is YES (Z is less than $Z\_total$), processes of steps 340 to 360 (370) are performed for each tag.

At first, it is determined whether or not the tag, being an object, has been in a status in which the power supply thereof has been switched on at any time while it travels for the distance z by employing the tag power supply on/off situation calculated in the step 20 (step 340).

When a determination in the step 340 is YES (the tag, being an object, is in a status in which the power supply thereof has been switched on at any time while it travels for the distance z), the operation of the tag is decided in accordance with a promise settled for preventing the reply from the tag specified by the collision avoidance protocol operation simulating means 2 from colliding, responding to the status of the tag (the transmission stop status, the standby status, or the like) filed in the tag status parameter 3 at its time point, and a text of the command of the reader in the step 320 (step 350).

In addition hereto, it is determined whether or not the tag, being an object, has been in a status where the power supply thereof has been switched on at any time while it travels for a distance $Z\_int$ (step 360). $Z\_int$ is representative of a distance by which the tag migrates until a head of the next command is received after the process of the above command is finished.

When a process in the step 360 is YES (the tag, being an object, is in a status in which the power supply thereof is switched on at any time while it travels for the distance Z_int), the process for the above tag is finished.

When a determination in the step 340 is No (there exists the situation in which the tag, being an object, is in a status in which the power supply is switched off while it travels for the distance z), or when a determination in the step 360 is NO (there exists the situation in which the tag, being an object, is in a status in which the power supply is switched off while it travels for the distance Z_int), the status of the tag is changed responding to a change in the radio wave situation (step 370). Specifically, the tag that is in any status returns to the initial status, being a status posterior to the activation of the power supply, when the power supply thereof is switched on after it is switched off temporally. Thereafter, the process for the above tag is finished.

The processes of the step 340 to 360 (370) are performed for all tags each of which is an object, and the read situation of the tag is updated upon receipt of its result (step 380). For example, when the above command is a command for requesting a reply of the tag, and only one piece of the tag out of plural pieces of the tags has given the ID as a reply in the processes of the step 340 to 360 (370), the read situation of the above tag is assumed to a "tag-already-read off situation", which is stored in a tag-made-a-reply status managing means not shown in the figure. When many piece of the tags out of plural pieces of the tags have given the ID as a reply, the above read process interprets this fact as an occurrence of collision of the tag companions with each other, and the read situation of the tag is not updated. Thereafter, the above Z_int is added to Z (step 390), and the operation returns to the step 320.

Hereinafter, the steps 320 to 380 will be specifically explained by employing FIG. 8. Now think about the case that two pieces of tags A and B exist as a read-object tag. It is assumed that the tag A, which is in a status of standing by for purpose of making an ID reply, is in a status of being able to make an ID reply when the reader requests an ID reply of the above tag.

On the other hand, it is assumed that the tag B is in a status of having stopped to make an ID reply because the reader has already loaded it. Further, it is assumed that the tag A was in a status in which the power supply thereof was switched on at any time while the tag A executed the command, whereas the tag B was in a situation in which the power supply thereof was temporally switched off while the tag B received the command. It is assumed that the command for requesting an ID reply is given to all tags as a command specified in the step 320, and the tag position does not reach the finishing point even at the time that the above command is finished (A determination in the step 330 is YES).

In the above condition, when a determination in the step 340 becomes YES, the tag A performs an operation of the ID reply as an operation of the tag in the step 350 responding to the command from the reader. Thereafter, a determination as well in the step 360 becomes YES. On the other hand, the status of the tag B is changed to the initial status, being a status posterior to the activation of the power supply, in the step 370 because a determination in the step 340 becomes NO. Herein, the initial status is interpreted in two ways; the first interpretation is that the initial status is synonymous with the standby status. Further, the second interpretation is that the initial status is representative of the status just after the power supply of the tag has been switched on, and yet is a status that, thereafter, transits to the standby status upon receipt of the command saying the effect of transiting to the standby status from the reader.

Figure 8:
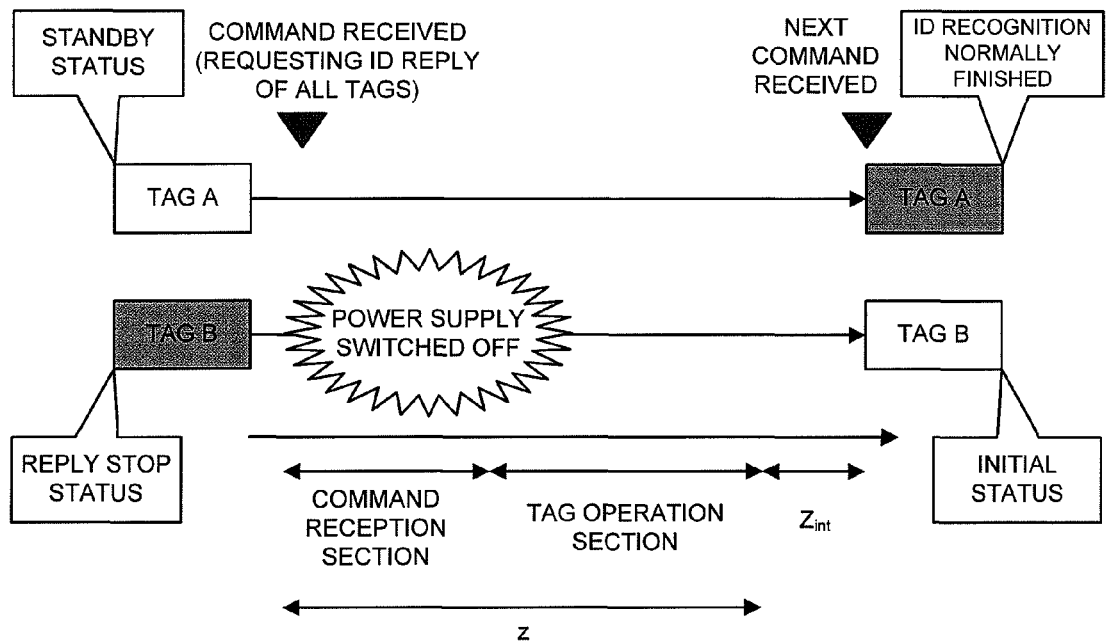
FIG. 8 is a view for specifically explaining the step 30 of the present invention.

Further, a status of "ID recognition normally finished" is described in FIG. 8. In a case where the tag receives a command for requesting a reply stop from the reader when it is in this status, it transits to "a reply stop status"

When the processes of the steps 340 to 360 (370) for the two pieces of the tags are finished, the read situation of the tag is updated in a step 380, and is stored in a tag status managing means that is not shown in the figure. In this example, the tag A is added as an already-read tag.

In this exemplary example, at the moment of estimating a read operation of the step 30, a process section (z) of one command is assumed to be a unit of analysis (a loop from the step 320 to the step 390 in FIG. 5); however, employment of other analysis units does not matter in the exemplary embodiment of the present invention.

For example, with the process section of a one-bit reader command signal or a one-bit tag signal assumed to be an analysis section, the read process may be executed one bit by one bit.

AN Exemplary Example 2

The exemplary example 2 will be explained while a reference to the accompanied drawings is made. In the foregoing exemplary example 1, only the consequence that the power supply of the tag was switched off due to an insufficient supply of the power from the reader was taken into consideration as a cause of the failure of communication between the reader and the tag. In the exemplary example 2, the consequence as well due to a reception error that occurs even when the power supply of the tag has been switched on is taken into consideration as a cause of the failure of communication between the reader and the tag. The to-be-targeted side with the reception error herein is both of the tag and the reader.

The functional block diagram illustrating a summary of this exemplary example is one as shown in FIG. 1, and its text is one explained in the exemplary example 1. Further, the flowchart illustrating a summary of an operation of FIG. 1 is one as shown in FIG. 2 and its text is one explained in the exemplary example 1.

Figure 6:
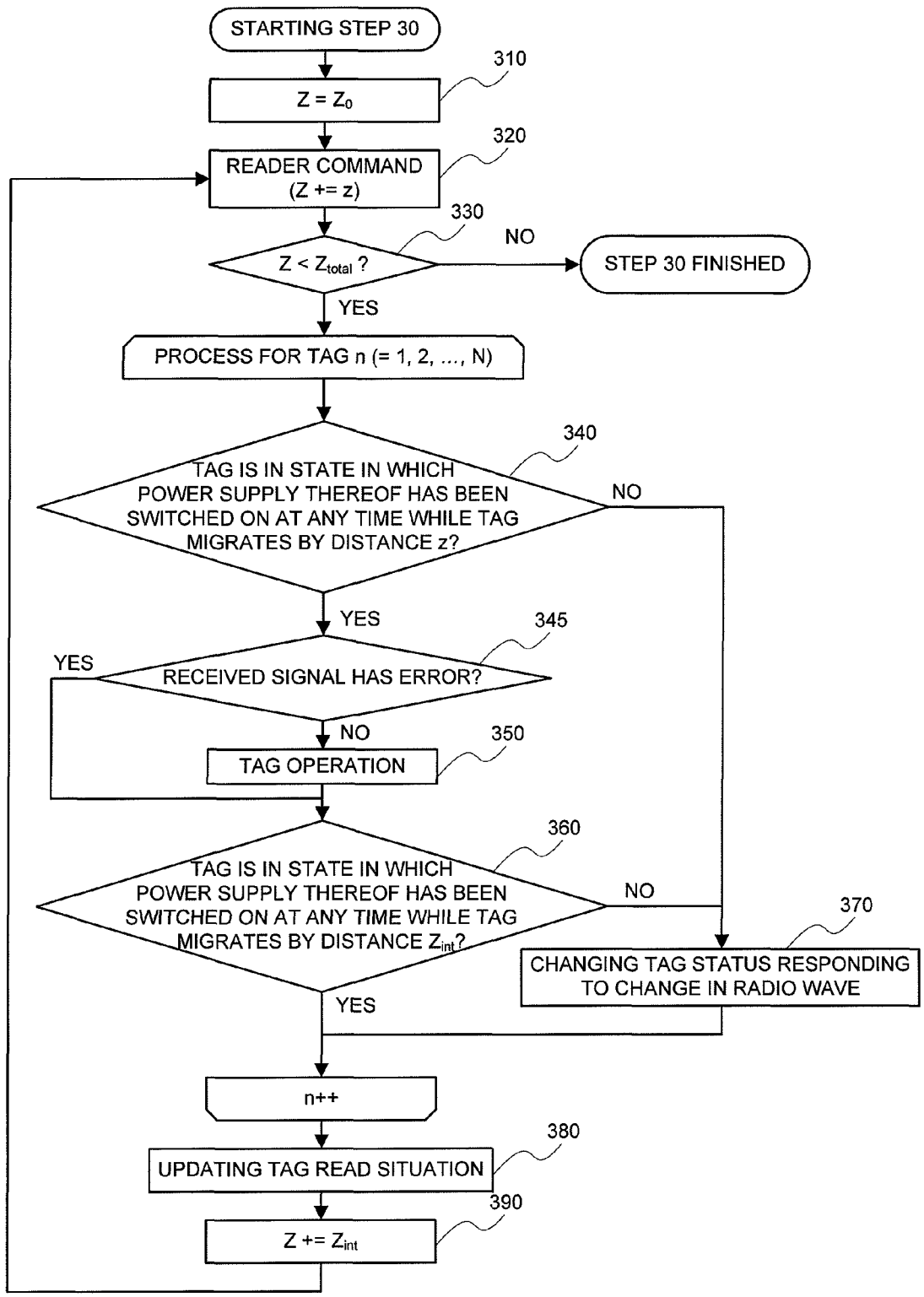
FIG. 6 is a flowchart illustrating the details of an operation of the step 30 of the present invention.

The detailed flowchart in the step 30 in this exemplary example is shown in FIG. 6. In this exemplary example, when a determination in the step 340 is YES, the process of determining whether or not an error exists in the reception signal is added (step 345). The to-be-targeted side with the reception error determination that is made herein is both of the tag and the reader. The reception error in the tag side is calculated based upon a feature of a rate of the bit error over the reception power in the tag by employing a technique of modulating the command signal of the reader, and the reception power being calculated based upon a link budget that reaches the tag from the reader. The reception error in the reader side is calculated based upon a feature of a rate of the bit error over the reception power in the reader by employing a technique of modulating the tag reply signal, and the reception power being calculated based upon the link budget that goes from the reader, reflects at the tag, and returns to the reader.

Further, an interference power quantity as well being received by the reader antenna is preferably taken into consideration at the moment of determining the reception error in the reader side. The interference power quantity being received by the reader antenna may be pre-designated by the user in the step 10 in some cases, and may be obtained from the surrounding system installation situation and the surrounding layout by employing the method of estimating the radio wave propagation in some cases. When a determination in the step 345 is NO, the process of the tag operation of the step 350 is performed similarly to the exemplary example 1. When a determination in the step 345 is YES, the operation shifts to the step 360.

In this exemplary example, at the moment of estimating the read operation of the step 30, a process section (z) of one command is assumed to be a unit of analysis (a loop from the step 320 to the step 390 in FIG. 5); however, employment of other analysis units does not matter in the exemplary embodiment of the present invention. For example, with the process section of a one-bit reader command signal or a one-bit tag signal assumed to be an analysis section, the read process may be executed one bit by one bit.

AN Exemplary Example 3

The exemplary example 3 will be explained while a reference to the accompanied drawings is made. In this exemplary example, it is made a rule to calculate the average read feature by executing the read situation estimation of the exemplary example 1 or the exemplary example 2 a predetermined number of times while changing the computation condition.

The functional block diagram illustrating a summary of this exemplary example is one as shown in FIG. 1, and its text is one explained in the exemplary example 1.

Figure 3:
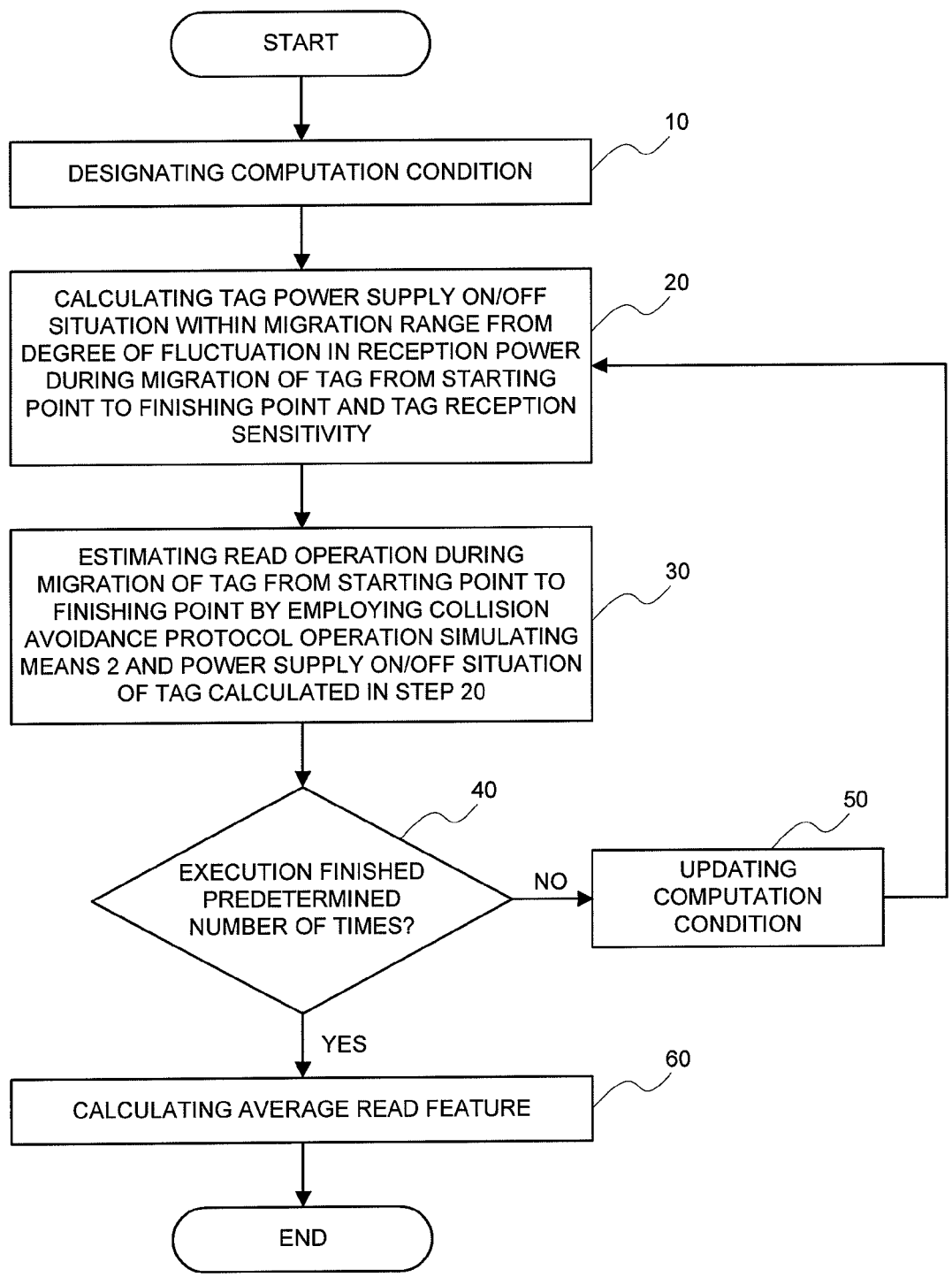
FIG. 3 is a flowchart illustrating a summary of an operation of a third exemplary example of the present invention.

The flowchart illustrating a summary of this exemplary example is shown in FIG. 3. Steps 10 to 30 of this exemplary example are identical to the operation in the exemplary example 1 or the exemplary example 2, and its text is one explained in the exemplary example 1 or the exemplary example 2. However, in the step 10, the number of times of the computation, which is performed in the steps 20 to 30, is pre-given. It does no matter that the detailed flowchart of the step 30 assumes any of the form shown in the exemplary example 1 (FIG. 5) and the form shown in the exemplary example 2 (FIG. 6). In the step 40 of this exemplary example, it is determined whether or not the computation of the steps 20 and 30 has been executed a predetermined number of times. When a determination in the step 40 is NO (the computation has not been executed yet a predetermined number of times), the computation condition is updated, and the computations of the steps 20 and 30 are executed again (step 50). With the computation condition being updated in the step 50, the parameter that is not definitely settled in the utilization environment is assumed to be an object of the updating. For example, by envisaging that a person is moving in the adjacent of the evaluation location, the degree of a fluctuation in the reception power of the tag is changed. Or, by taking the degree of dispersion in the reception power of the tag into consideration, the reception sensitivity of the tag is changed. When a determination in the step 40 is YES (the computation has been already executed a predetermined number of times), the average value of the read feature in each trial that has been made so far is obtained (step 60).

In this exemplary example, it is made a rule to pre-decide the predetermine number of times of the computation; however, in particular, the predetermine number of times of the computation is not decided at the time of starting the computation and the computation may be finished at the stage that the average feature has converged fully. Specifically, the steps 10 to 30 and the step 60 are executed repeatedly, it is determined whether or not the average feature being obtained in the step 60 has converged fully, and the computation is finished when it is determined that the average feature has converged fully. When it is not determined that the average feature has converged fully, the computation condition is updated, and the steps 10 to 30 and the step 60 are executed again.

With regard to the computation condition designated by the user, out of the computation conditions being designated in the step 10, each of the read situation estimating systems in accordance with the exemplary examples 1 to 3 includes an input box for inputting it. Further, as a result of estimating the read situation, the tag reading off in each trial and the tag not read off in each trial are visually displayed together with the affixation locations and situations thereof in some cases, and the read rate (a total number of the read-off tags over the total number of the tags each of which is an object of the reading-off) is displayed in some cases.

AN Exemplary Example 4

The exemplary example 4 will be explained while a reference to the accompanied drawings is made. In this exemplary example, it is made a rule to update the computation condition so that the average read situation estimation result of the exemplary example 3 falls under a pre-designated range. This exemplary example makes it possible to automatically derive the system design guideline and the operation guideline for satisfying the desired feature of the user.

The functional block diagram illustrating a summary of this exemplary example is one as shown in FIG. 1, and its text is one explained in the exemplary example 1.

Figure 4:
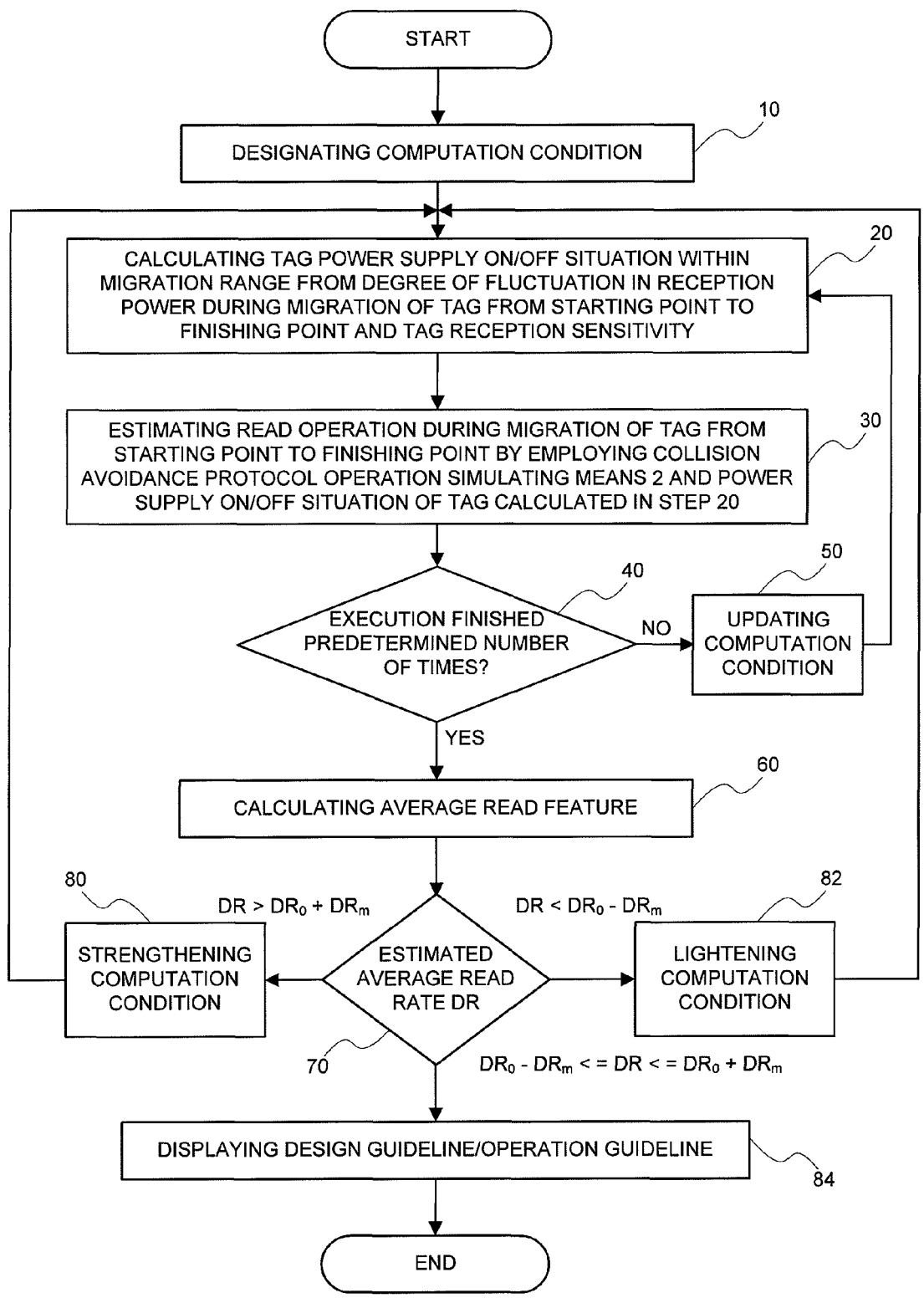
FIG. 4 is a flowchart illustrating a summary of an operation of a fourth exemplary example of the present invention.

The flowchart illustrating a summary of this exemplary example is shown in FIG. 4. Steps 10 to 60 of this exemplary example are identical to the operation in the exemplary example 3, and its text is one explained in the exemplary example 1 to the exemplary example 3. However, in the step 10, the desired feature of the read situation is given. In this exemplary example, a desired value (DR_0) of the average read rate and its permitted width (DR_m) are given. It does no matter that the detailed flowchart of the step 30 assumes any of the form shown in the exemplary example 1 (FIG. 5) and the form shown in the exemplary example 2 (FIG. 6). In a step 70 of this exemplary example, it is determined whether or not an average read rate (DR) computed in the steps 20 to 60 falls under the permitted width as against the desired value (DR_0). When DR is larger than DR_0+DR_m, the computation condition is strengthened (step 80). With the computation condition being updated in the step 80, the parameter associated with the design guideline and the operation guideline of the RFID system, being an object of evaluation, becomes an object of the updating.

As its example, it is thinkable that the migration speed of the tag is increased, the number of the pieces of the tags is augmented, the output power of the reader antenna is lowered, or the like. How the parameter is actually updated depends upon a design policy and an operation policy of the user. For example, with the case that the number of the pieces of the tags cannot be changed in a lump due to the operation situation, but the speed of the forklift is changeable, the migration speed of the tag may be assumed to be an object of the changing.

Further, by setting a changeable range and a priority degree to each of a plurality of the parameters, it is also possible to assume a plurality of the parameters to be an object of the changing, respectively. When DR is smaller than DR_0−DR_m, the computation condition is lightened contrarily to the step 80 (step 82). With the computation condition being updated in the step 82, a parameter other than the parameter, which becomes an object of the changing in the step 50, out of changeable parameters becomes an object of the updating.

For example, the parameter, which the user can set, out of the parameters of the collision avoidance protocol is included as a parameter, being an object of the updating, in addition to the parameters associated with the design guideline and the operation guideline of the system employed in the step 80. In the step 82, if possible, the parameter exerting no influence upon the design policy and the operation policy is preferably assumed to be an object of the updating. Unless only these parameters satisfy the desired performance, the parameter exerting an influence upon the design policy and the operation policy is assumed to be an object of the updating; however which parameter is actually updated depends upon the design policy and the operation policy of the user.

For example, with the case that the number of the pieces of the tags cannot be changed in a lump due to the operation situation, but the speed of the forklift is changeable, the migration speed of the tag may be assumed to be an object of the changing. Further, by setting a changeable range and a priority degree to each of a plurality of the parameters, it is also possible to assume a plurality of the parameters to be an object of the changing, respectively. When DR has been settled between DR_0−DR_m and DR_0+DR_m, the computation is finished, and the computation condition at its time point is displayed as a system design guideline and a system operation guideline for satisfying the desired feature of the user (step 84).

With regard to the computation condition designated by the user out of the computation conditions being designated in the step 10, the read situation estimating system in accordance with the exemplary example 4 includes an input box for inputting it. In addition hereto, it includes a box for inputting the desired feature of the user. Further, as a result of estimating the read situation, for example, the optimal arrangement position of the antenna, the upper limit of the tag migration speed, the upper limit of the number of the tags, or the like is displayed as a system design guideline and a system operation guideline for satisfying the desired feature of the user.

The present invention explained above is applicable to the application for, in the actual operation environment, clarifying the design guidelines for realizing the required performance such as the optimization of the antenna installation location and the optimization of the protocol parameter, and the operation guidelines such as the upper limits of the number of the tags and the migration speed at the moment of introducing the passive RFID system because the read feature in the actual operation environment is estimated. Further, it is applicable to the application as well for clarifying the required specification by the system side for the degree of dispersion in the reception sensitivity of the tag. Besides, for various technologies of improving the system performance for the passive RFID, its quantitative effect is clarified, thereby enabling the present invention to be applied for the application as well such as derivation of the optimal forms of these technologies.

The above explanation was made on the premise that the operations of the status estimating means or the operation estimating means were realized in a hardware-manner. However, executing a program for executing each foregoing means with a computer machine enables these operations to be realized in a software-manner as well. This software program is preserved, for example, in a magnetic disc, a semiconductor device memory, or a record medium other than these, and is loaded into the computer machine from its record medium, and controlling its operation makes it also possible to realize the foregoing function.

The invention claimed is:

1. An estimating system comprising:
    a power supply status estimating means for, within a detection region which includes more than one transmitting devices, each transmitting device of said transmitting devices being affixed to a corresponding detection object, said detection object being detected by a reading device, estimating a power supply activation status of said transmitting device accompanied by a migration of said detection object;
    a status estimating means for estimating a status of said transmitting device accompanied by the migration based upon said estimated power supply activation status of said transmitting device and an operational history of said transmitting device; and
    an operation estimating means for determining an operation of said transmitting device based upon the status of said transmitting device responding to a command sent by the reading device,
    wherein said operation estimating means determines whether said transmitting device is unidentifiable based on the number of said transmitting device having replied to the command, and
    wherein said operation estimating means, when the number of said transmitting device having replied to the command is two or more, determines that said transmitting device is unidentifiable.

2. An estimating system according to claim 1, characterized in that said operation estimating means, when the number of said transmitting device having replied to the command is one, determines that said transmitting device is identifiable.

3. An estimating system according to claim 1, characterized in that when said operation estimating means has determined that said transmitting device is unidentifiable, said operation estimating means decides a second command based upon a collision avoidance protocol simulating means, being an agreement for preventing the reply from colliding.

4. An estimating system according to claim 1, characterized in that said operation estimating means comprises a means for estimating an average reply situation of said transmitting device based upon a result of having executed the operation a predetermined number of times.

5. An estimating system according to claim 4, wherein said operation estimating means updates computation condition to cause said average response situation of said transmitting device to fall under a predetermined range.

6. An estimating system according to claim 1, characterized in that said operation is a reply by said transmitting device to the command.

7. An estimating method comprising:
    a power supply status estimating step of, within a detection region which includes more than one transmitting devices, each transmitting device of said transmitting devices being affixed to a corresponding detection object, said detection object being detected by a reading device, estimating a power supply activation status of said transmitting device accompanied by a migration of said detection object;
    a status estimating step of estimating a status of said transmitting device accompanied by the migration based upon said estimated power supply activation status of said transmitting device and an operational history of said transmitting device; and
    an operation estimating step of determining an operation of said transmitting device based upon the status of said transmitting device responding to a command sent by the reading device, wherein said operation estimating step determines whether said transmitting device is unidentifiable based on the number of said transmitting device having replied to the command, and wherein said operation estimating step, when the number of said transmitting device having replied to the command is two or more, determines that said transmitting device is unidentifiable.

8. An estimating method according to claim 7, characterized in that said operation estimating step, when the number of said transmitting device having replied to the command is one, determines that said transmitting device is identifiable.

9. An estimating method according to claim 7, characterized in that when said operation estimating step has determined that said transmitting device is unidentifiable, said operation estimating step decides a second command based upon a collision avoidance protocol simulating means, being an agreement for preventing the reply from colliding.

10. An estimating method according to claim 7, characterized in that said operation estimating step comprises step of estimating an average reply situation of said transmitting device based upon a result of having executed the operation a predetermined number of times.

11. An estimating method according to claim 10, wherein said operation estimating step updates computation condition to cause said average response situation of said transmitting device to fall under a predetermined range.

12. An estimating method according to claim 7, characterized in that said operation is a reply by said transmitting device to the command.

13. A non-transitory computer-readable medium having a program for causing a computer to execute:

a power supply status estimating process of, within a detection region which includes more than one transmitting devices, each transmitting device of said transmitting devices being affixed to a corresponding detection object, said detection object being detected by a reading device, estimating a power supply activation status of said transmitting device accompanied by a migration of said detection object;

a status estimating process of estimating a status of said transmitting device accompanied by the migration based upon said estimated power supply activation status of the transmitting device and an operational history of said transmitting device; and an operation estimating process of determining an operation of said transmitting device based upon the status of said transmitting device responding to a command sent by the reading device, wherein said operation estimating process determines whether said transmitting device is unidentifiable based upon the number of said transmitting device having replied to the command, and wherein said operation estimating process, when the number of said transmitting device having replied to the command is two or more, determines that said transmitting device is unidentifiable.

14. A non-transitory computer-readable storage medium according to claim 13, characterized in that said operation is a reply by said transmitting device to the command.

* * * * *